(12) United States Patent
Cao et al.

(10) Patent No.: US 10,689,255 B2
(45) Date of Patent: Jun. 23, 2020

(54) METHOD FOR RECOVERING AND PURIFYING WASTE SULFURIC ACID SOLUTION

(71) Applicant: Xiangtan University, Xiangtan, Hunan (CN)

(72) Inventors: Jing Cao, Hunan (CN); Chengkang Hu, Hunan (CN); Junfeng Zhang, Hunan (CN); Yan Huang, Hunan (CN)

(73) Assignee: Xiangtan University, Xiangtan, Hunan (CN)

( * ) Notice: Subject to any disclaimer, the term of this patent is extended or adjusted under 35 U.S.C. 154(b) by 0 days.

(21) Appl. No.: 16/553,972

(22) Filed: Aug. 28, 2019

(65) Prior Publication Data

US 2019/0382266 A1    Dec. 19, 2019

(30) Foreign Application Priority Data

Dec. 12, 2018  (CN) .......................... 2018 1 1514494
May 23, 2019  (CN) .......................... 2019 1 0432779

(51) Int. Cl.
*C01B 17/90* (2006.01)

(52) U.S. Cl.
CPC ................................. *C01B 17/901* (2013.01)

(58) Field of Classification Search
CPC ....... C01B 17/69; C01B 17/90; C01B 17/901; C01B 17/903; C01B 17/906; C01B 17/907; C01B 17/908
See application file for complete search history.

(56) References Cited

U.S. PATENT DOCUMENTS 5,051,187 A * 9/1991 Matsumoto ........... C01B 17/903
                                                        210/639

* cited by examiner

*Primary Examiner* — Timothy C Vanoy

(57) ABSTRACT

A method for recovering and purifying a waste sulfuric acid solution includes steps of: adding a coupling agent (m) to the waste sulfuric acid solution, and mixing uniformly to obtain a mixture (a); adding a coupling agent (n) to the mixture (a), and mixing uniformly to obtain a mixture (b); and adding a synergistic agent to the mixture (b), thoroughly stirring and filtering to obtain a purified sulfuric acid solution. The method adds the coupling agent and the synergistic agent to the waste sulfuric acid, and a removal rate of the heavy metal ions in the waste sulfuric acid can reach 99%. The purified sulfuric acid solution can be recycled. The method is simple to operate, and can remove a wide variety of heavy metal ions such as copper, zinc, lead, mercury, nickel, iron, cadmium and manganese in the waste sulfuric acid.

16 Claims, 1 Drawing Sheet

METHOD FOR RECOVERING AND PURIFYING WASTE SULFURIC ACID SOLUTION

CROSS REFERENCE OF RELATED APPLICATION

The present invention claims priority under 35 U.S.C. 119(a-d) to CN 201910432779.7, filed May 23, 2019; and to CN 201811514494.X, filed Dec. 12, 2018.

BACKGROUND OF THE PRESENT INVENTION

Field of Invention

The present invention relates to a technical field of waste acid treatment, and more particularly to a method for recovering and purifying a waste sulfuric acid solution.

Description of Related Arts

In the process of chemical production, a large amount of sulfuric acid is consumed. For example, the lead-acid battery industry, the titanium dioxide industry, the non-ferrous metal smelting gas acid producing, the non-ferrous metal smelting industry, and the steel industry require a large amount of sulfuric acid for processing, causing large amount of waste sulfuric acid containing heavy metal ions. This waste sulfuric acid is mainly formed by sulfuric acid, supplemented by various organic substances and heavy metal ions. If the waste sulfuric acid is directly discharged, it will cause great harm to the natural environment and it is also a waste of sulfuric acid.

With the increasingly strict environmental protection requirements in China and the increasing shortage of sulfur resources, the development and optimization of treatment technologies for waste sulfuric acid and sulfur-containing waste liquids are of great significance for improving sulfur utilization. Conventionally, there are a variety of waste sulfuric acid recovery technologies in China. For example, Chinese patent application CN201710530900.0 discloses a high-temperature purification process for sulfate-containing waste sulfuric acid in the process of recycling sulfuric acid from waste sulfuric acid. It has a path of waste sulfuric acid→cracking furnace→high temperature washing and purifying→drying absorption→conversion→finished sulfuric acid. The processing process is very complicated, the effect is not good, the operation is cumbersome, and the removal rate of heavy metal ions is relatively low.

SUMMARY OF THE PRESENT INVENTION

Therefore, an object of the present invention is to provide a method for recovering and purifying waste sulfuric acid solution. The method adds a coupling agent and a synergistic agent to the waste sulfuric acid, so as to substantially remove heavy metal ions in the waste sulfuric acid, wherein the waste sulfuric acid solution can be recycled after purification.

Accordingly, in order to accomplish the above objects, the present invention provides a method for recovering and purifying a waste sulfuric acid solution, comprising steps of:

S1: adding a coupling agent (m) to the waste sulfuric acid solution, and mixing uniformly to obtain a mixture (a);

S2: adding a coupling agent (n) to the mixture (a), and mixing uniformly to obtain a mixture (b); and S3: adding a synergistic agent to the mixture (b), thoroughly stirring and filtering to obtain a purified sulfuric acid solution.

Preferably, the method further comprises a step of filtering the waste sulfuric acid solution before the step S1.

Preferably, the method further comprises a step of detecting heavy metal ion concentration in the waste sulfuric acid solution before the step S1.

Preferably, the method further comprises a step of processing the purified sulfuric acid solution with activated carbon adsorption after the step S3, so as to obtain a sulfuric acid solution.

Preferably, the coupling agent (m) is selected from a group consisting of quinoline, biquinoline, pyridine, 4,4-bipyridine, phenanthroline, and terpyridine; the coupling agent (n) is selected from a group consisting of benzaldehyde, glyoxal, oxalic acid, ascorbic acid, pyruvic acid, picolinic acid, valine and proline.

Preferably, the synergistic agent is selected from a group consisting of tetrafluoroboric acid, sodium tetrafluoroborate, potassium tetrafluoroborate, phosphoric acid, sodium phosphate, potassium phosphate, boric acid, sodium borate, potassium borate, silicic acid, sodium silicate, potassium thiocyanate, sodium thiocyanate, sodium thiosulfate, and potassium thiosulfate.

Preferably, the step S1 specifically comprises: adding the coupling agent (m) to the waste sulfuric acid solution, stirring at 20-200 r/min for 10-30 min, and mixing uniformly to obtain the mixture (a).

Preferably, the step S2 specifically comprises: adding the coupling agent (n) to the mixture (a), stirring at 20-200 r/min for 10-30 min, and mixing uniformly to obtain the mixture (b).

Preferably, the step S3 specifically comprises: adding the synergistic agent to the mixture (b), stirring at 40-160 r/min for 30-120 min, and filtering to obtain the purified sulfuric acid solution.

Preferably, a mass ratio of the coupling agent (m), the coupling agent (n), the synergistic agent and heavy metal ion in the waste sulfuric acid solution is (1.0-4.0):(0.01-2.0):(1.0-2.0):1.

The present invention provides the method for recovering and purifying the waste sulfuric acid solution. The method adds the coupling agent and the synergistic agent to the waste sulfuric acid, and a removal rate of the heavy metal ions in the waste sulfuric acid can reach 99%. The purified sulfuric acid solution can be recycled. The method is simple to operate, and can remove a wide variety of heavy metal ions such as copper, zinc, lead, mercury, nickel, iron, cadmium and manganese in the waste sulfuric acid. Especially, for waste lead-acid battery waste sulfuric acid solution, iron ion removal rate is high, and the purified sulfuric acid solution can be reused as a lead-acid battery electrolyte.

BRIEF DESCRIPTION OF THE DRAWINGS

In order to more clearly illustrate the technical solutions according to embodiments of the present invention, drawings used in detailed description of the embodiments will be briefly described below. Obviously, the drawings in the following description are effect representations of some embodiments of the present invention. Those of ordinary skill in the art may obtain other drawings based on the following drawings without creative work.

DETAILED DESCRIPTION OF THE PREFERRED EMBODIMENT

Figure 1:
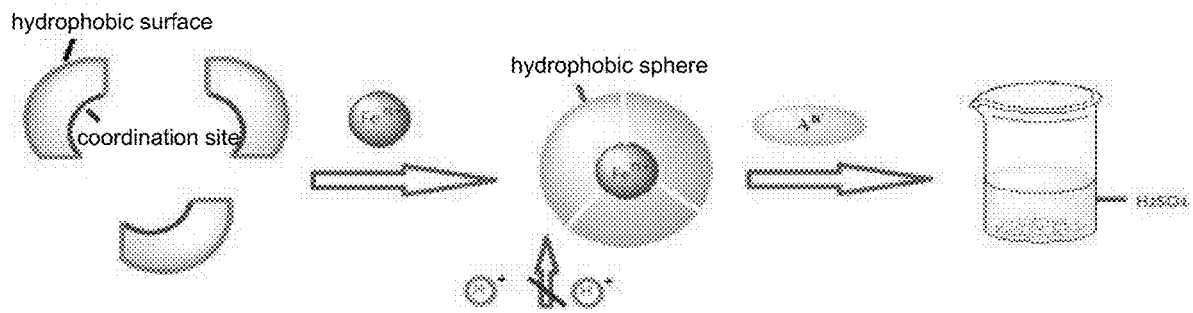
FIG. 1 illustrates principles of recovery and purification of waste sulfuric acid solution in a lead-acid battery.

Technical solutions in embodiments of the present invention are clearly and completely described below with reference to the embodiments of the present invention. It is obvious that the described embodiments are a part of the embodiments of the present invention, and not all of the embodiments. All other embodiments obtained by those skilled in the art based on the embodiments of the present invention without creative efforts are within the scope of the present invention.

It should be understood that in the specification and claims, the terms "include" and "comprises" indicate the existence of features, ensembles, steps, operations, elements and/or components, and do not exclude the existence or addition of one or more other features, integers, steps, operations, elements, components and/or combinations thereof.

It is further understood that the term "and/or" used in the specification and claims of the present invention means any possible combinations of one or more of the associated listed items, and includes such combinations.

A method for recovering and purifying a waste sulfuric acid solution is provided, comprising steps of:

filtering the waste sulfuric acid solution to remove flocs and particulates;

adding a coupling agent m to the filtered waste sulfuric acid solution, stirring at 20-200 r/min for 10-30 min, and mixing uniformly to obtain a mixture a;

adding a coupling agent n to the mixture a, stirring at 20-200 r/min for 10-30 min, and mixing uniformly to obtain a mixture b;

adding a synergistic agent to the mixture b, stirring at 40-160 r/min for 30-120 min, and filtering to obtain a purified sulfuric acid solution; and processing the purified sulfuric acid solution with activated carbon adsorption, so as to obtain a sulfuric acid solution;

wherein the coupling agent m is selected from a group consisting of quinoline, biquinoline, pyridine, 4,4-bipyridine, phenanthroline, and terpyridine; the coupling agent n is selected from a group consisting of benzaldehyde, glyoxal, oxalic acid, ascorbic acid, pyruvic acid, picolinic acid, valine and proline; the synergistic agent is selected from a group consisting of tetrafluoroboric acid, sodium tetrafluoroborate, potassium tetrafluoroborate, phosphoric acid, sodium phosphate, potassium phosphate, boric acid, sodium borate, potassium borate, silicic acid, sodium silicate, potassium thiocyanate, sodium thiocyanate, sodium thiosulfate, and potassium thiosulfate.

Before the waste sulfuric acid solution is purified, concentration of heavy metal ions is measured. Generally, the concentration of heavy metal ions is measured by an atomic absorption spectrometer, and the amount of heavy metal ions in the waste sulfuric acid to be treated is calculated, so that amounts of the coupling agent as well as the synergistic agent are determined. Normally, both are in excess. When the coupling agent and the synergistic agent are used, the amount of the coupling agent m is 1.0-4.0 times of the equivalent of the heavy metal ions contained in the waste sulfuric acid; the amount of the coupling agent n is 0.01-2.0 times of the equivalent of the heavy metal ions contained in the waste sulfuric acid; and the synergistic agent is 1.0-2.0 times of the equivalent of the heavy metal ions contained in the waste sulfuric acid.

During activated carbon adsorption, it is mainly to adsorb the excess coupling agent and the synergistic agent, so that the purified waste sulfuric acid solution is further purified.

The method can process a large amount of heavy metal waste liquid, and can treat waste sulfuric acid containing various heavy metal ions such as copper, zinc, lead, mercury, nickel, iron, cadmium and manganese.

Embodiments 1-4 are described in detail as waste sulfuric acid solution treatment in waste lead-acid battery.

After being crushed and sorted, the waste lead-acid battery is divided into plastic, lead grid, lead paste and waste sulfuric acid, among which plastic and lead grid can be directly recycled and reused. Because of the high lead content, lead paste has good economic value for recycling. However, another important resource in the waste lead-acid battery is the sulfuric acid electrolyte, that is, the waste sulfuric acid solution. Because it contains heavy metal impurities such as $Pb^{2+}$, most of the industry conventionally uses lime to neutralize the slag. However, this treatment method produces a large amount of toxic neutralizing slag and wastes lime as well as sulfuric acid resources.

The best recovery route for waste sulfuric acid in lead-acid batteries is reusing as lead-acid battery raw materials after purification, which can meet the needs of resource recycling and meet the basic requirements of pollutant control. However, compared to the lead-acid battery electrolyte, iron ion content is too high in the conventional lead-acid battery waste sulfuric acid solution, which may be caused by electrolyte corrosion to mechanical equipment during the actual crushing and separation process. Meanwhile, other metal contents are very low, if it is recycled and reused as lead-acid battery electrolyte, it has no effect, such as lead ions.

The presence of iron ions will seriously reduce the precipitation potential of hydrogen, and promote the problem of unqualified product quality and greatly reduced service life caused by gassing of the negative electrode plate of lead-acid batteries. Therefore, iron ions are a huge obstacle to the reuse of sulfuric acid electrolyte.

The conventional methods for removing heavy metal ions from wastewater are mainly divided into precipitation method, adsorption method, ion exchange method, extraction method, membrane separation method, etc., but they are not suitable for purification of heavy metals in lead-acid battery waste sulfuric acid, especially the separation and removal of iron ions. This is mainly because: 1. iron ions usually cannot form effective precipitation under strong acidic conditions; 2. excessive acidity has strong inhibitory effect on iron ion adsorption, ion exchange and extraction processes; 3. $SO_4^{2-}$ coordination ability is very weak, which makes it impossible for $Fe^{3+}$ to achieve adsorption separation by means of electrical conversion. The separation and removal of $Fe^{3+}$ in hydrochloric acid is feasible mainly because $Cl^-$ can complex with $Fe^{3+}$ in hydrochloric acid to form $[FeCl_6]^{3-}$, wherein electrical property is reversed and volume is increase, so that it can be captured by an anion exchange resin or a macroporous adsorption resin.

The above three factors lead to that it is difficult to separate and remove iron ions in waste sulfuric acid other than the membrane classification method. However, in the case of membrane purification treatment of lead storage battery waste sulfuric acid, such method still has strict limits. For example, it is required that the waste sulfuric acid must be diluted into a solution having a concentration lower than 5% to be treated; in addition, the secondary treatment of the concentrated liquid is required, the price of the membrane is high, service life is short, and operating costs are high.

A method for recovering and purifying a waste sulfuric acid solution of a waste lead-acid battery is provided, comprising steps of:

filtering the waste sulfuric acid solution of the waste lead-acid battery to remove flocs and particulates;

adding a coupling agent m to the filtered waste sulfuric acid solution of the waste lead-acid battery, stirring at 20-200 r/min for 10-30 min, and mixing uniformly to obtain a mixture a;

adding a coupling agent n to the mixture a, stirring at 20-200 r/min for 10-30 min, and mixing uniformly to obtain a mixture b;

adding a synergistic agent to the mixture b, stirring at 40-160 r/min for 30-120 min, and filtering to obtain a purified sulfuric acid solution; and processing the purified sulfuric acid solution with activated carbon adsorption, so as to obtain a sulfuric acid solution;

wherein the coupling agent m is selected from a group consisting of quinoline, biquinoline, pyridine, 4,4-bipyridine, phenanthroline, and terpyridine; the coupling agent n is selected from a group consisting of benzaldehyde, glyoxal, oxalic acid, ascorbic acid, pyruvic acid, picolinic acid, valine and proline; the synergistic agent is selected from a group consisting of tetrafluoroboric acid, sodium tetrafluoroborate, potassium tetrafluoroborate, phosphoric acid, sodium phosphate, potassium phosphate, boric acid, sodium borate, potassium borate, silicic acid, sodium silicate, potassium thiocyanate, sodium thiocyanate, sodium thiosulfate, and potassium thiosulfate;

wherein the waste sulfuric acid solution of the waste lead-acid battery is filtered to remove flocs and particulates, in such a manner that the suspension or precipitate of the waste sulfuric acid solution in the waste lead-acid battery due to crushing and sorting can be remove, that is, remove the solid impurities by filtration.

Before the waste sulfuric acid solution of the waste lead-acid battery is purified, concentration of iron ions is measured. Generally, the concentration of iron ions is measured by an atomic absorption spectrometer, and the amount of iron ions in the waste sulfuric acid to be treated is calculated, so that amounts of the coupling agent as well as the synergistic agent are determined. Normally, both are in excess. When the coupling agent and the synergistic agent are used, the amount of the coupling agent m is 1.0-4.0 times of the equivalent of the iron ions contained in the waste sulfuric acid; the amount of the coupling agent n is 0.01-2.0 times of the equivalent of the iron ions contained in the waste sulfuric acid; and the synergistic agent is 1.0-2.0 times of the equivalent of the iron ions contained in the waste sulfuric acid.

Since the strong competition of hydrogen ions in the highly acidic environment seriously interferes with the coordination of iron ions, after filtration, the filtrate is subjected to soluble iron removal, as shown in FIG. 1. According to the principle of molecular hydrophobicity, the coupling agent m whose external side has hydrophobicity and internal side has multiple coordination sites are used. The coupling agent m is selected from a group consisting of quinoline, biquinoline, pyridine, 4,4-bipyridine, phenanthroline, and terpyridine, which are all aromatic heterocyclic compounds. The aromatic heterocyclic compounds form a hydrophobic spheroidal iron ion system by spatial synergy, and the hydrophilic hydrogen ions are repelled outside the sphere. Then the coupling agent n is added, which is selected from a group consisting of benzaldehyde, glyoxal, oxalic acid, ascorbic acid, pyruvic acid, picolinic acid, valine and proline. The coupling agent n has a certain reducing property, and can reduce the ferric ion system or iron ions to divalent iron, so that the hydrophobic spherical ferrous iron ion system can be more stable and greatly exists in the waste sulfuric acid solution waste of the lead-acid battery. Then the synergistic agent is added, which is generally selected from a group consisting of tetrafluoroboric acid, sodium tetrafluoroborate, potassium tetrafluoroborate, phosphoric acid, sodium phosphate, potassium phosphate, boric acid, sodium borate, potassium borate, silicic acid, sodium silicate, potassium thiocyanate, sodium thiocyanate, sodium thiosulfate, and potassium thiosulfate. Due to the large deformability of the synergistic agent anionic acid ions, when contacted with the hydrophobic spherical ferrous iron ion system, the two are coupled to each other to form aggregates having covalent characteristics and low solubility and being precipitated from the sulfuric acid solution. Meanwhile, the precipitation process drives the ligand and the iron ion in a direction favorable for complex equilibrium, so that the competition of the hydrogen ion and the aromatic ring hetero atom is reduced, and the separation and removal of the iron ion in the sulfuric acid solution system are realized.

When the activated carbon is added, the precipitate or complex of the sulfuric acid solution system can be removed. At the same time, since the coupling agent m, the coupling agent n and the synergistic agent are generally used in excess, the excess coupling agent m and the coupling agent n and the synergistic agent are adsorbed and removed together to further purify the waste sulfuric acid solution of the waste lead-acid battery.

Figure 2:
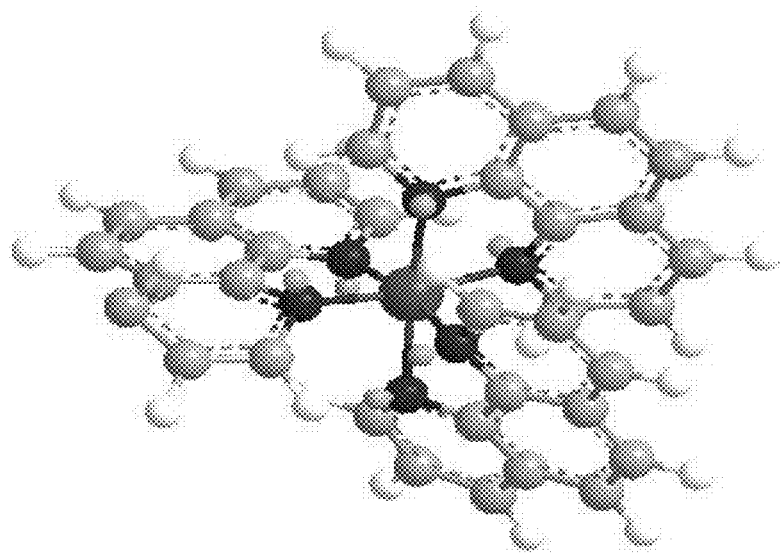
FIG. 2 is a sketch view of coordination atoms of an aromatic heterocyclic ligand and iron ions.

Among them, the atomic number of iron is 26, which is located in the first column of group VIII of the fourth period. The outer electron valence electron arrangement is $3d^64s^2$, the common oxidation number is +2 and +3, and the ion configuration is respectively $3d^6$ and $3d^5$, which normally forms a hexacoordinate compound of a regular octahedral configuration. When the ligand forms a hexacoordinate ion with the iron ion, the hydrophilic atom containing N, O and the like coordinates inward with the iron ion, and the non-hydrophilic aromatic ring coordinates outwardly resembles a hydrophobic spheroid. The three-dimensional coordination space between aromatic heterocyclic ligand and iron ion is shown in FIG. 2, wherein the deep color middle-positioned large volume ion is ferrous ion, and the six periphery deep colors are atoms in the aromatic heterocycle matched with ferrous ions. Therefore, the aromatic heterocyclic ligand and the iron complex ion can construct a hydrophobic micro-environment at the molecular level to achieve superior competition and precise coating of the hydrogen ion.

The organic cation in which the aromatic heterocyclic ring is coordinated with the iron ion to form a hexacoordinate has a certain hydrophobic ability, and only needs to be combined with an anion having a relatively high affinity to form a poorly soluble substance from the solution.

Embodiment 1

Filtering 20 L waste sulfuric acid solution of the waste lead-acid battery to remove flocs and particulates;

detecting an iron ion content, which was 0.097%; adding biquinoline and 4,4-bipyridine to the filtered waste sulfuric acid solution of the waste lead-acid battery, wherein amounts of biquinoline and 4,4-bipyridine added was 1 times of iron ion equivalent contained in the waste sulfuric acid; stirring at 110 r/min for 10 min, and mixing uniformly to obtain a mixture a;

adding oxalic acid to the mixture a, wherein an amount of the oxalic acid added was 0.01 times of the iron ion equivalent contained in the waste sulfuric acid; stirring at 200 r/min for 10 min, and mixing uniformly to obtain a mixture b;

adding tetrafluoroboric acid to the mixture b, wherein an amount of the tetrafluoroboric acid added was 2 times of the iron ion equivalent contained in the waste sulfuric acid; stirring at 40 r/min for 60 min, and filtering to obtain a purified sulfuric acid solution; and processing the purified sulfuric acid solution with activated carbon column adsorption, so as to obtain a sulfuric acid solution.

Embodiment 2

Filtering 50 L waste sulfuric acid solution of the waste lead-acid battery to remove flocs and particulates;

detecting an iron ion content, which was 0.070%; adding biquinoline and terpyridine to the filtered waste sulfuric acid solution of the waste lead-acid battery, wherein amounts of biquinoline and terpyridine added was 4 times of iron ion equivalent contained in the waste sulfuric acid; stirring at 20 r/min for 30 min, and mixing uniformly to obtain a mixture a;

adding proline to the mixture a, wherein an amount of the proline added was 2 times of the iron ion equivalent contained in the waste sulfuric acid; stirring at 200 r/min for 10 min, and mixing uniformly to obtain a mixture b;

adding potassium tetrafluoroborate to the mixture b, wherein an amount of the potassium tetrafluoroborate added was 1 times of the iron ion equivalent contained in the waste sulfuric acid; stirring at 60 r/min for 90 min, and filtering to obtain a purified sulfuric acid solution; and processing the purified sulfuric acid solution with activated carbon column adsorption, so as to obtain a sulfuric acid solution.

Embodiment 3

Filtering 1 L waste sulfuric acid solution of the waste lead-acid battery to remove flocs and particulates;

detecting an iron ion content, which was 0.110%; adding phenanthroline to the filtered waste sulfuric acid solution of the waste lead-acid battery, wherein an amount of phenanthroline added was 2 times of iron ion equivalent contained in the waste sulfuric acid; stirring at 40 r/min for 30 min, and mixing uniformly to obtain a mixture a;

adding oxalic acid to the mixture a, wherein an amount of the oxalic acid added was 0.05 times of the iron ion equivalent contained in the waste sulfuric acid; stirring at 180 r/min for 15 min, and mixing uniformly to obtain a mixture b;

adding sodium thiosulfate to the mixture b, wherein an amount of the sodium thiosulfate added was 1.5 times of the iron ion equivalent contained in the waste sulfuric acid; stirring at 120 r/min for 60 min, and filtering to obtain a purified sulfuric acid solution; and processing the purified sulfuric acid solution with activated carbon column adsorption, so as to obtain a sulfuric acid solution.

Embodiment 4

Filtering 10 L waste sulfuric acid solution of the waste lead-acid battery to remove flocs and particulates;

detecting an iron ion content, which was 0.120%; adding 4,4-bipyridine and terpyridine to the filtered waste sulfuric acid solution of the waste lead-acid battery, wherein amounts of 4,4-bipyridine and terpyridine added was 3 times of iron ion equivalent contained in the waste sulfuric acid; stirring at 120 r/min for 30 min, and mixing uniformly to obtain a mixture a;

adding picolinic acid to the mixture a, wherein an amount of the picolinic acid added was 1.5 times of the iron ion equivalent contained in the waste sulfuric acid; stirring at 80 r/min for 25 min, and mixing uniformly to obtain a mixture b;

adding silicic acid to the mixture b, wherein an amount of the silicic acid added was 1.8 times of the iron ion equivalent contained in the waste sulfuric acid; stirring at 100 r/min for 30 min, and filtering to obtain a purified sulfuric acid solution; and processing the purified sulfuric acid solution with activated carbon column adsorption, so as to obtain a sulfuric acid solution.

The content of heavy metal ions in the purified sulfuric acid solution of embodiments 1-4 was detected by taking manganese ion, copper ion and iron ion as examples, especially the iron ion, and the measurement results are as follows:

| No. | Iron ion before (%) | Iron ion after (%) | Iron ion removal rate (%) | Copper ion before (%) | Copper ion after (%) | Copper ion removal rate (%) | Manganese ion before (%) | Manganese ion after (%) | Manganese ion removal rate (%) |
|---|---|---|---|---|---|---|---|---|---|
| 1 | 0.097 | 0.0008 | 99.17 | 0.011 | 0.0002 | 98.18 | 0.00059 | 0.000005 | 99.15 |
| 2 | 0.070 | 0.0006 | 99.14 | 0.012 | 0.0003 | 97.5 | 0.00046 | 0.000004 | 99.13 |
| 3 | 0.110 | 0.0010 | 99.09 | 0.0097 | 0.0001 | 98.96 | 0.00073 | 0.000005 | 99.31 |
| 4 | 0.120 | 0.0011 | 99.08 | 0.011 | 0.0002 | 98.18 | 0.00063 | 0.000004 | 99.36 |

It can be seen from the above table that the purified sulfuric acid solution has a particularly low content of heavy metal ions, and the removal rate of heavy metal ions is very high, wherein the manganese ion removal rate is more than 99%, and the copper ion removal rate is also above 97.5%. Especially, due to high original concentration, the iron ion removal rate is above 99% after purification. The purified sulfuric acid solution can be completely recovered and reused as lead-acid battery electrolyte.

Embodiments 5-7 are described for waste sulfuric acid solutions of other sources. The heavy metal ions of other sources of waste sulfuric acid solution generally differ according to the source, and the contents of various heavy metals are different, but the main heavy metal ions are: copper, zinc, lead, mercury, nickel, iron, cadmium and manganese.

Embodiment 5

Filtering 50 L waste sulfuric acid solution of lead-zinc smelting flue gas to remove flocs and particulates;

adding 1.5 g biquinoline and 1.5 g terpyridine to the filtered waste sulfuric acid solution of the lead-zinc smelting flue gas; stirring at 20 r/min for 30 min, and mixing uniformly to obtain a mixture a;

adding 0.5 g proline to the mixture a; stirring at 200 r/min for 10 min, and mixing uniformly to obtain a mixture b;

adding a synergistic agent to the mixture b; stirring at 60 r/min for 90 min, and filtering to obtain a purified sulfuric acid solution; and processing the purified sulfuric acid solution with activated carbon adsorption, so as to obtain a sulfuric acid solution.

Embodiment 6

Filtering 1 L waste sulfuric acid solution of titanium dioxide to remove flocs and particulates;

adding 25 g phenanthroline to the filtered waste sulfuric acid solution of the titanium dioxide; stirring at 40 r/min for 30 min, and mixing uniformly to obtain a mixture a;

adding 0.5 g oxalic acid to the mixture a; stirring at 180 r/min for 15 min, and mixing uniformly to obtain a mixture b;

adding 20 g sodium thiosulfate to the mixture b; stirring at 120 r/min for 60 min, and filtering to obtain a purified sulfuric acid solution; and processing the purified sulfuric acid solution with activated carbon adsorption, so as to obtain a sulfuric acid solution.

Embodiment 7

Filtering 10 L waste sulfuric acid solution of lead-zinc smelting to remove flocs and particulates;

adding 5.5 g 4,4-bipyridine and 5.5 g terpyridine to the filtered waste sulfuric acid solution of the lead-zinc smelting; stirring at 120 r/min for 30 min, and mixing uniformly to obtain a mixture a;

adding 0.5 g picolinic acid to the mixture a; stirring at 80 r/min for 25 min, and mixing uniformly to obtain a mixture b;

adding 3 g 10% silicic acid to the mixture b; stirring at 100 r/min for 30 min, and filtering to obtain a purified sulfuric acid solution; and processing the purified sulfuric acid solution with activated carbon adsorption, so as to obtain a sulfuric acid solution.

The content of heavy metal ions in the purified sulfuric acid solution of embodiments 5-7 was detected. According to comparisons 1-3, heavy metals were adsorbed by adsorption method. The measurement results are as follows:

| No. | Heavy metal ion before (%) | Heavy metal ion after (%) | Heavy metal ion removal rate (%) |
|---|---|---|---|
| Embodiment 5 | 0.21 | 0.00020 | 99.9 |
| Embodiment 6 | 0.34 | 0.00067 | 99.8 |
| Embodiment 7 | 0.28 | 0.0028 | 99.0 |
| Comparison 1 | 0.21 | 0.045 | 78.5 |
| Comparison 2 | 0.34 | 0.078 | 77.01 |
| Comparison 3 | 0.28 | 0.065 | 76.8 |

It can be seen from the above table that the removal rates of heavy metals in the purified sulfuric acid solution is very high, which are above 99%, and even up to 99.9%. Meanwhile, according to comparisons 1-3 which adsorbs heavy metal ions by adsorption methods, the removal rates are about 77%. In the method of the present invention for removing heavy metal ions, the removal rate of heavy metal ions is greatly improved, and the sulfuric acid solution after removing the heavy metal ions can be completely recovered and reused.

The steps in the methods of the embodiments of the present invention may be sequentially adjusted, merged, and deleted according to actual needs.

The present invention has been described in detail, and the principles and embodiments of the present invention have been described by way of specific examples. The above embodiments are only used to help understand the method of the present invention and its core idea. Therefore, for a person skilled in the art, the scope of the present invention is not limited by the specification.

A person skilled in the art can clearly understand that for the convenience and brevity of the description, the specific working process of the system and the unit described above can refer to the corresponding process in the foregoing method embodiments, and details are not described herein again.

What is claimed is:

1. A method for recovering and purifying a waste sulfuric acid solution, comprising steps of:
   S1: adding a coupling agent (m) to the waste sulfuric acid solution, and mixing uniformly to obtain a mixture (a);
   S2: adding a coupling agent (n) to the mixture (a), and mixing uniformly to obtain a mixture (b); and
   S3: adding a synergistic agent to the mixture (b), thoroughly stirring and filtering to obtain a purified sulfuric acid solution.

2. The method, as recited in claim 1, further comprising a step of filtering the waste sulfuric acid solution before the step S1.

3. The method, as recited in claim 1, further comprising a step of detecting heavy metal ion concentration in the waste sulfuric acid solution before the step S1.

4. The method, as recited in claim 1, further comprising a step of processing the purified sulfuric acid solution with activated carbon adsorption after the step S3, so as to obtain a sulfuric acid solution.

5. The method, as recited in claim 1, wherein the coupling agent (m) is selected from a group consisting of quinoline, biquinoline, pyridine, 4,4-bipyridine, phenanthroline, and terpyridine; the coupling agent (n) is selected from a group consisting of benzaldehyde, glyoxal, oxalic acid, ascorbic acid, pyruvic acid, picolinic acid, valine and proline.

6. The method, as recited in claim 2, wherein the coupling agent (m) is selected from a group consisting of quinoline, biquinoline, pyridine, 4,4-bipyridine, phenanthroline, and terpyridine; the coupling agent (n) is selected from a group consisting of benzaldehyde, glyoxal, oxalic acid, ascorbic acid, pyruvic acid, picolinic acid, valine and proline.

7. The method, as recited in claim 3, wherein the coupling agent (m) is selected from a group consisting of quinoline, biquinoline, pyridine, 4,4-bipyridine, phenanthroline, and terpyridine; the coupling agent (n) is selected from a group consisting of benzaldehyde, glyoxal, oxalic acid, ascorbic acid, pyruvic acid, picolinic acid, valine and proline.

8. The method, as recited in claim 4, wherein the coupling agent (m) is selected from a group consisting of quinoline, biquinoline, pyridine, 4,4-bipyridine, phenanthroline, and terpyridine; the coupling agent (n) is selected from a group consisting of benzaldehyde, glyoxal, oxalic acid, ascorbic acid, pyruvic acid, picolinic acid, valine and proline.

9. The method, as recited in claim 1, wherein the synergistic agent is selected from a group consisting of tetrafluoroboric acid, sodium tetrafluoroborate, potassium tetrafluoroborate, phosphoric acid, sodium phosphate, potassium phosphate, boric acid, sodium borate, potassium borate, silicic acid, sodium silicate, potassium thiocyanate, sodium thiocyanate, sodium thiosulfate, and potassium thiosulfate.

10. The method, as recited in claim 2, wherein the synergistic agent is selected from a group consisting of tetrafluoroboric acid, sodium tetrafluoroborate, potassium tetrafluoroborate, phosphoric acid, sodium phosphate, potassium phosphate, boric acid, sodium borate, potassium borate, silicic acid, sodium silicate, potassium thiocyanate, sodium thiocyanate, sodium thiosulfate, and potassium thiosulfate.

11. The method, as recited in claim 3, wherein the synergistic agent is selected from a group consisting of tetrafluoroboric acid, sodium tetrafluoroborate, potassium tetrafluoroborate, phosphoric acid, sodium phosphate, potassium phosphate, boric acid, sodium borate, potassium borate, silicic acid, sodium silicate, potassium thiocyanate, sodium thiocyanate, sodium thiosulfate, and potassium thiosulfate.

12. The method, as recited in claim 4, wherein the synergistic agent is selected from a group consisting of tetrafluoroboric acid, sodium tetrafluoroborate, potassium tetrafluoroborate, phosphoric acid, sodium phosphate, potassium phosphate, boric acid, sodium borate, potassium borate, silicic acid, sodium silicate, potassium thiocyanate, sodium thiocyanate, sodium thiosulfate, and potassium thiosulfate.

13. The method, as recited in claim 1, wherein the step S1 specifically comprises: adding the coupling agent (m) to the waste sulfuric acid solution, stirring at 20-200 r/min for 10-30 min, and mixing uniformly to obtain the mixture (a).

14. The method, as recited in claim 1, wherein the step S2 specifically comprises: adding the coupling agent (n) to the mixture (a), stirring at 20-200 r/min for 10-30 min, and mixing uniformly to obtain the mixture (b).

15. The method, as recited in claim 1, wherein the step S3 specifically comprises: adding the synergistic agent to the mixture (b), stirring at 40-160 r/min for 30-120 min, and filtering to obtain the purified sulfuric acid solution.

16. The method, as recited in claim 1, wherein a mass ratio of the coupling agent (m), the coupling agent (n), the synergistic agent and heavy metal ion in the waste sulfuric acid solution is (1.0-4.0):(0.01-2.0):(1.0-2.0):1.

* * * * *